US011939201B2

(12) United States Patent
Miyatani et al.

(10) Patent No.: US 11,939,201 B2
(45) Date of Patent: Mar. 26, 2024

(54) REPLACEABLE COMPONENT FOR A DISPENSE HEAD, A DISPENCE HEAD, AND A METHOD OF USING A DISPENSE HEAD

(71) Applicants: Asahi Group Holdings, Ltd., Tokyo (JP); Asahi Breweries, Ltd., Tokyo (JP)

(72) Inventors: Tomohisa Miyatani, Ibaraki (JP); Tsutomu Maeda, Ibaraki (JP); Masanori Yamagishi, Tokyo (JP); Motohiro Inagaki, Tokyo (JP)

(73) Assignees: ASAHI GROUP HOLDINGS, LTD., Tokyo (JP); ASAHI BREWERIES, LTD., Tokyo (JP)

( * ) Notice: Subject to any disclaimer, the term of this patent is extended or adjusted under 35 U.S.C. 154(b) by 16 days.

(21) Appl. No.: 17/762,445

(22) PCT Filed: Dec. 10, 2020

(86) PCT No.: PCT/JP2020/046042

§ 371 (c)(1),
(2) Date: Mar. 22, 2022

(87) PCT Pub. No.: WO2021/149391

PCT Pub. Date: Jul. 29, 2021

(65) Prior Publication Data

US 2022/0332561 A1 Oct. 20, 2022

(30) Foreign Application Priority Data

Jan. 20, 2020 (JP) ................................ 2020-007126

(51) Int. Cl.
*B67D 1/08* (2006.01)

(52) U.S. Cl.
CPC ......... *B67D 1/0852* (2013.01); *B67D 1/0832* (2013.01)

(58) Field of Classification Search
CPC .............. Y10T 137/314; B67D 1/0852; B67D 1/0832; B67D 2210/00062
See application file for complete search history.

(56) References Cited

U.S. PATENT DOCUMENTS

| | | | | |
|---|---|---|---|---|
| 5,090,599 A | | 2/1992 | Stenger | |
| 5,145,096 A | * | 9/1992 | Stenger ................ | B67D 1/0839 251/149 |
| 2010/0308084 A1 | * | 12/2010 | Riis ...................... | B67D 1/0848 222/400.7 |

FOREIGN PATENT DOCUMENTS

| | | |
|---|---|---|
| JP | 2014-518184 | 7/2014 |
| JP | 2019-18860 | 2/2019 |

(Continued)

OTHER PUBLICATIONS

International Search Report dated Jan. 19, 2021 in International (PCT) Application No. PCT/JP2020/046042.

(Continued)

*Primary Examiner* — Vishal Pancholi
*Assistant Examiner* — Robert K Nichols, II
(74) *Attorney, Agent, or Firm* — Wenderoth, Lind & Ponack, L.L.P.

(57) ABSTRACT

A replaceable component for a dispense head includes a first pipe disposed to pass through an inside of a dispense head, a pressing portion capable of pressing a valve body of a beverage supply valve in a beverage container, and a sealing member. The sealing member includes a first sealing portion capable of coming in contact with a beverage outlet of the beverage container, and a membrane connected to the first sealing portion and inhibiting a beverage from adhering to the dispense head.

17 Claims, 13 Drawing Sheets

(56) References Cited

FOREIGN PATENT DOCUMENTS

| | | |
|---|---|---|
| JP | 2019-142581 | 8/2019 |
| WO | 2013/000932 | 1/2013 |

OTHER PUBLICATIONS

English translation of Office Action dated Dec. 12, 2023 in Japanese Application No. 2020-007126.

* cited by examiner

REPLACEABLE COMPONENT FOR A DISPENSE HEAD, A DISPENCE HEAD, AND A METHOD OF USING A DISPENSE HEAD

TECHNICAL FIELD

The present invention relates to a replaceable component for a dispense head, a dispense head, and a method of using a dispense head.

BACK GROUND ART

A technique of attaching a replaceable component to a dispense head is known. A used replaceable component is disposed and a new replaceable component is attached to the dispense head.

As a related art, Patent Literature 1 discloses a beverage dispensing system. The beverage dispensing system described in Patent Literature 1 has a dispense head and a replaceable connection unit. Further, the connection unit has a hollow piston member and a dispensing line connected to the hollow piston member. Moreover, the hollow piston member has a use indicator indicating if the replaceable connection unit was connected to a beverage container.

CITATION LIST

Patent Literature

[Patent Literature 1] JP 2014-518184A

SUMMARY

An object of the present invention is to provide a replaceable component for a dispense head, a dispense head, and a method of using a dispense head, which are capable of inhibiting a beverage from adhering to the dispense head.

A replaceable component for a dispense head according to some embodiments includes: a first pipe disposed to pass through an inside of a dispense head; a pressing portion capable of pressing a valve body of a beverage supply valve in a beverage container; and a sealing member. The sealing member includes: a first sealing portion capable of coming in contact with a beverage outlet of the beverage container; and a membrane connected to the first sealing portion and inhibiting a beverage from adhering to the dispense head.

A dispense head according to some embodiments is a dispense head to which the above-mentioned replaceable component for a dispense head can be attached. The dispense head includes: a dispense head main body; a plunger member into which the first pipe is inserted and moving the first sealing portion and the pressing portion downward by pressing the first pipe downward; and an operating member operating the plunger member such that the plunger member moves relative to the dispense head main body.

A method of using a dispense head according to some embodiments includes: attaching a replaceable component for a dispense head to a dispense head; attaching the dispense head to a beverage container; moving a plunger member of the dispense head downward; and moving the plunger member of the dispense head upward. The replaceable component for a dispense head includes: a first pipe; a pressing portion capable of pressing a valve body of a beverage supply valve in the beverage container; and a sealing member including a first sealing portion and a membrane inhibiting a beverage from adhering to the dispense head. The moving the plunger member of the dispense head downward includes deforming the membrane from a first state to a second state. Further, the moving the plunger member of the dispense head upward includes restoring the membrane from the second state to the first state.

According to the present invention, it is possible to provide a replaceable component for a dispense head, a dispense head, and a method of using a dispense head, which can inhibit a beverage from adhering to the dispense head.

DESCRIPTION OF EMBODIMENTS

Figure 1:
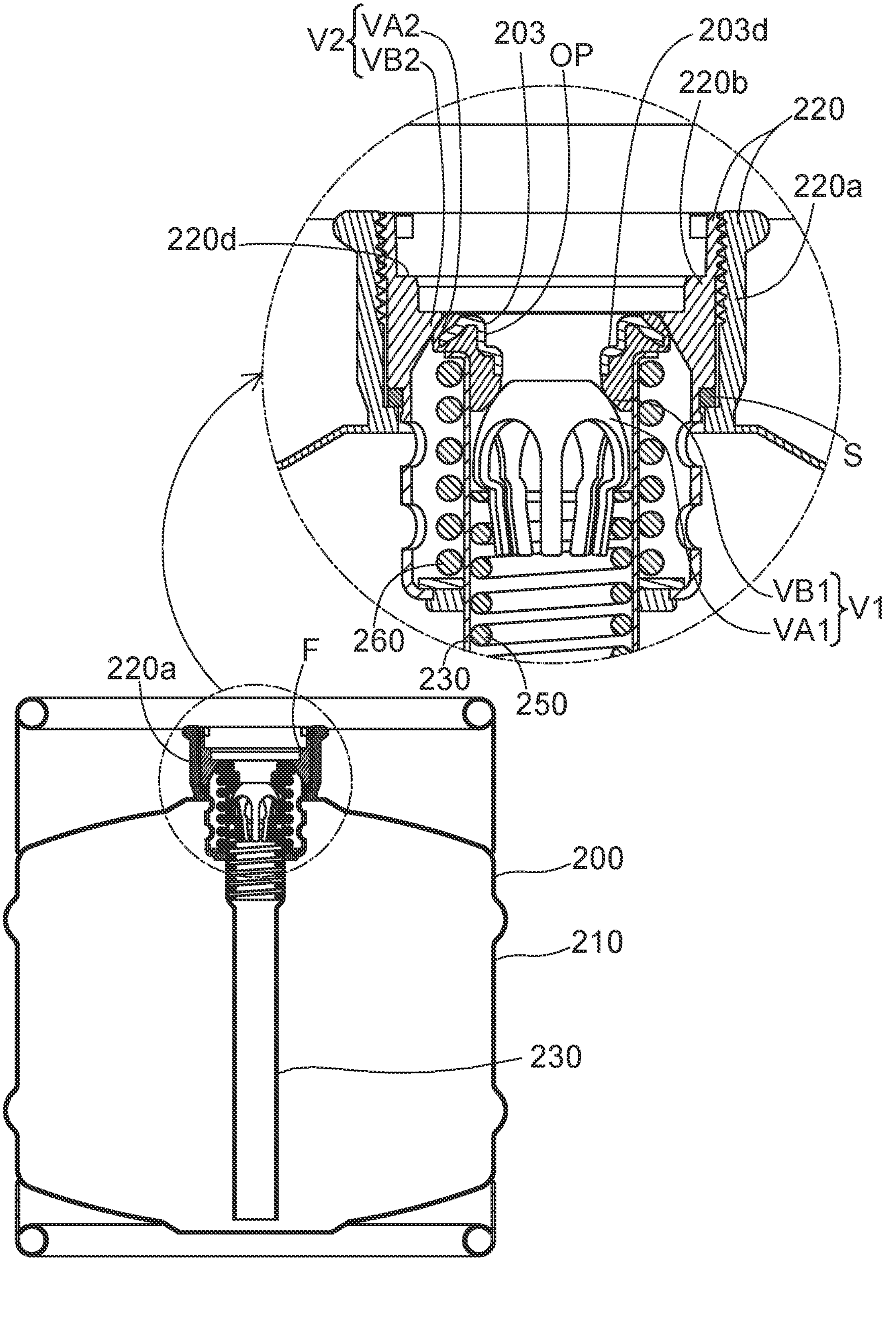
FIG. 1 is a schematic cross-sectional view schematically showing an example of a beverage container to which a dispense head according to some embodiments is to be attached.

Hereinafter, a replaceable component 1 for a dispense head, a dispense head 100, and a method of using a dispense head 100 according to some embodiments will be described with reference to the attached drawings. In the following description, members and portions having the same functions are denoted by the same reference numerals, and repeated descriptions of members and portions denoted by the same reference numerals are omitted.

(Beverage Container 200)

Referring to FIG. 1, an example of a beverage container 200 to which a dispense head 100 according to some embodiments is to be attached will be explained.

The beverage container 200 includes a container main body 210 for containing a beverage, a mouth member 220*a*, a fitting member F, and a sealing member S arranged between the mouth member 220*a* and the fitting member F. The container main body 210 is preferably made of metal (for example, made of stainless steel). However, the container main body 210 may be made of non-metal material.

Further, the mouth member 220*a* is preferably made of metal (for example, made of stainless steel). However, the mouth member 220*a* may be made of non-metal material.

In an example shown in FIG. 1, the fitting member F is attached to the mouth member 220*a*. The fitting member F includes an inner member 220*b* attached to an inside of the mouth member 220*a*, a beverage supply valve V1, a gas valve V2, a beverage extraction pipe 230, and a biasing member (250, 260).

In the example shown in FIG. 1, a portion of the inner member 220*b* that is arranged so as to face the mouth member 220*a* (for example, a portion located above the sealing member S) is integrated with the mouth member 220*a* by a threaded engagement, thus the portion functions as a part of a mouth portion. Therefore, in this specification, the mouth member 220*a* and the portion of the inner member 220*b* (more specifically, the portion of the inner member 220*b* that is arranged so as to face the mouth member 220*a*) are referred to as the mouth portion 220.

In the example shown in FIG. 1, the inner member 220*b* has a recess portion 220*d* that receives a second sealing portion 52 described later. In addition, the inner member 220*b* has a second valve seat portion VB2. The second valve seat portion VB2 functions as a valve seat portion of the gas valve V2. In the example shown in FIG. 1, the second valve seat portion VB2 is arranged below the recess portion 220*d*.

In the example shown in FIG. 1, a second valve body VA2 is arranged inside the inner member 220*b* (more specifically, arranged inside the second valve seat portion VB2). The second valve body VA2 functions as a valve body of the gas valve V2. In the example shown in FIG. 1, the second valve body VA2 is an annular member having an opening portion OP in its central portion. The opening portion OP of the second valve body VA2 functions as a beverage outlet 203 for taking out a beverage.

In an inner portion of an upper end portion of the second valve body VA2 (in other words, in the beverage outlet 203), a recess portion 203*d* for receiving a first sealing portion 51 described later is formed.

At a lower end portion of the second valve body VA2, a valve seat portion VB1 of the beverage supply valve V1 is arranged. In addition, the beverage extraction pipe 230 is attached to an outer peripheral surface of the second valve body VA2. The second valve body VA2 and the beverage extraction pipe 230 are biased upward by a second biasing member 260.

In the example shown in FIG. 1, a valve body VA1 is arranged inside the beverage extraction pipe 230. The valve body VA1 functions as a valve body of the beverage supply valve V1. The valve body VA1 is biased upward by a first biasing member 250.

Note that the above-mentioned beverage container 200 is only an example of the beverage container to which the dispense head 100 according to some embodiments is to be attached. In other words, the dispense head 100 according to some embodiments may be attached to a beverage container having a structure different from that of the beverage container 200 described above.

First Embodiment

Figure 2:
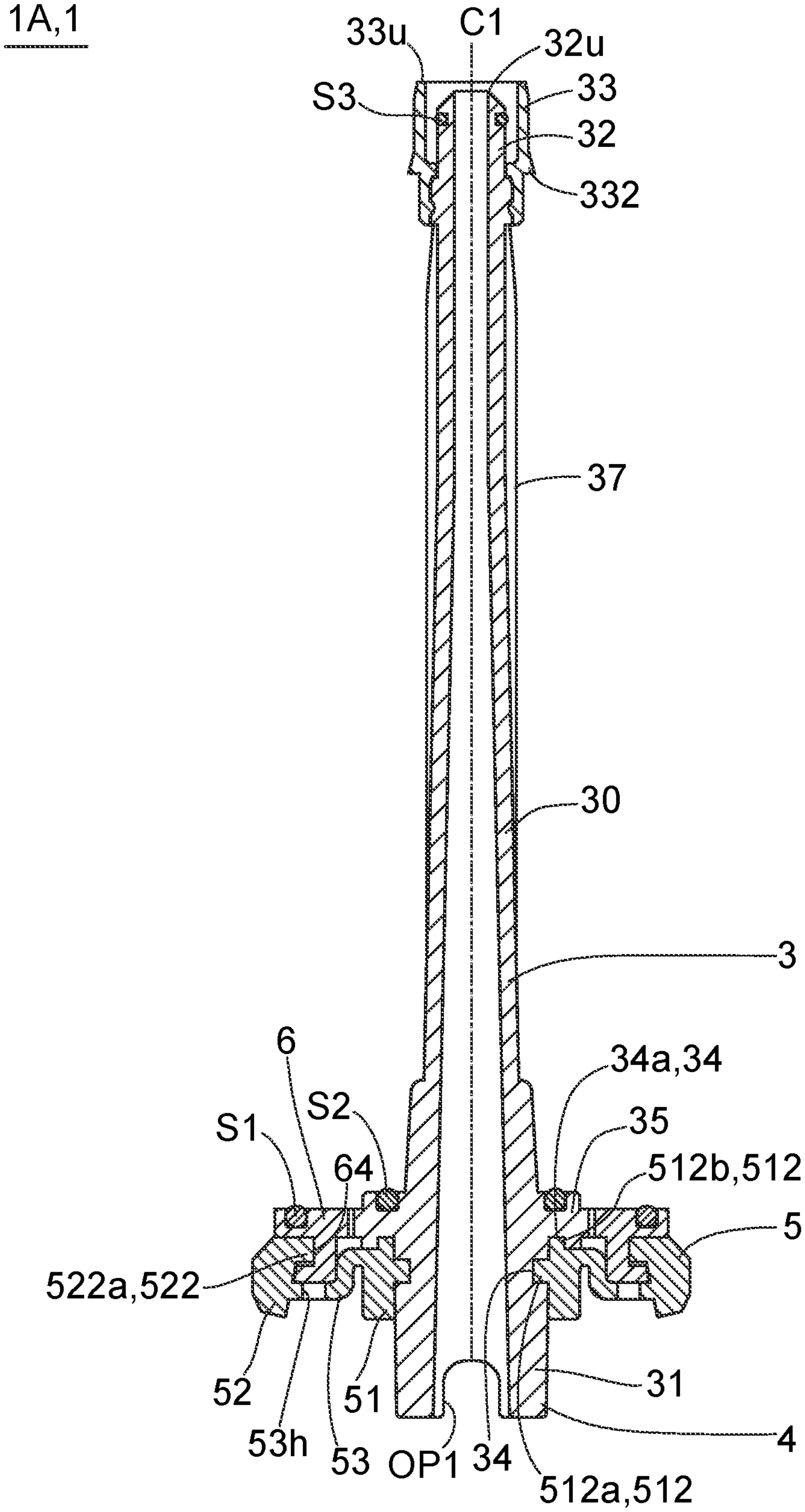
FIG. 2 is a schematic cross-sectional view schematically showing a replaceable component for a dispense head according to a first embodiment.
Figure 3:
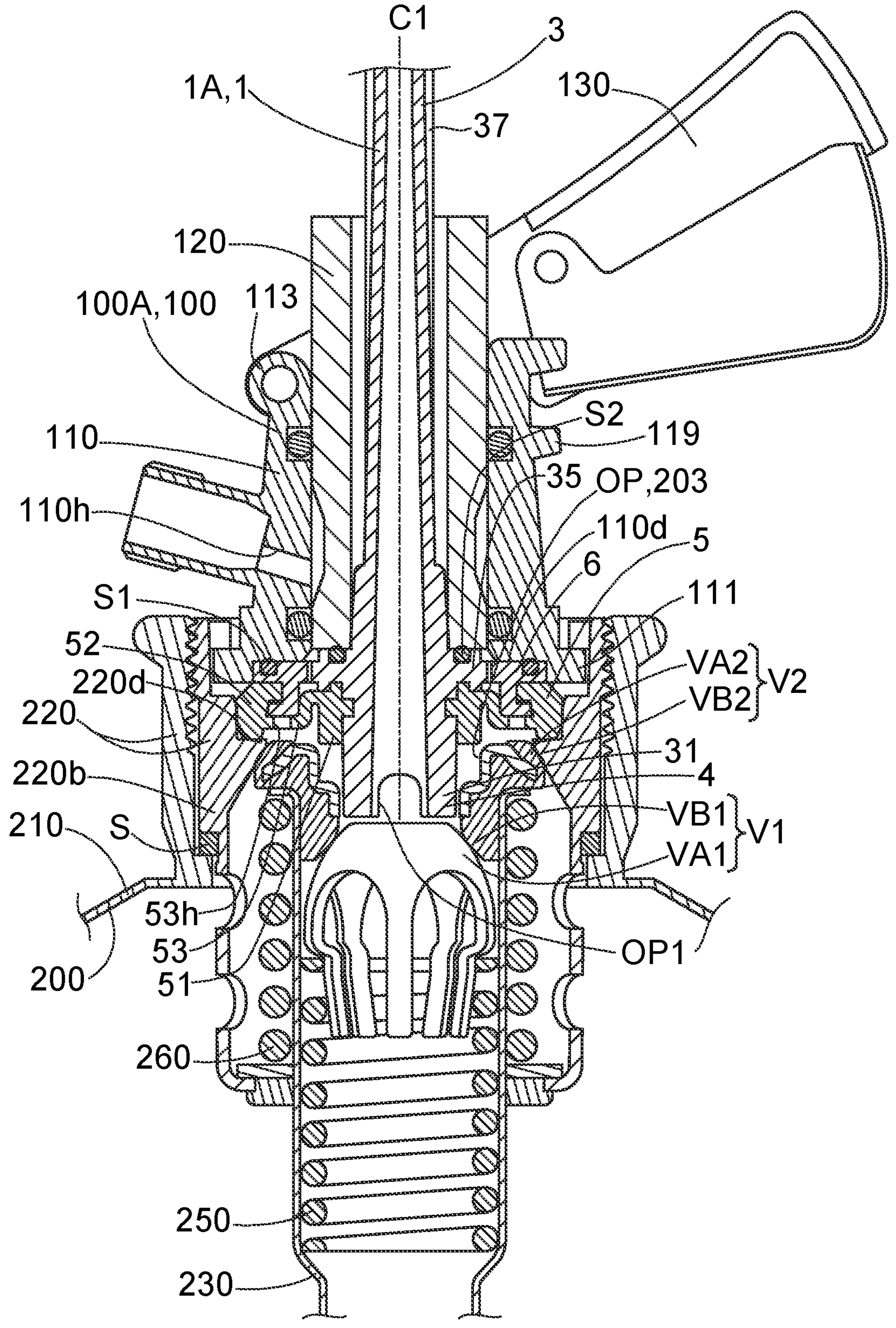
FIG. 3 is a schematic cross-sectional view schematically showing a state in which a dispense head is attached to a mouth portion of the beverage container.
Figure 4:
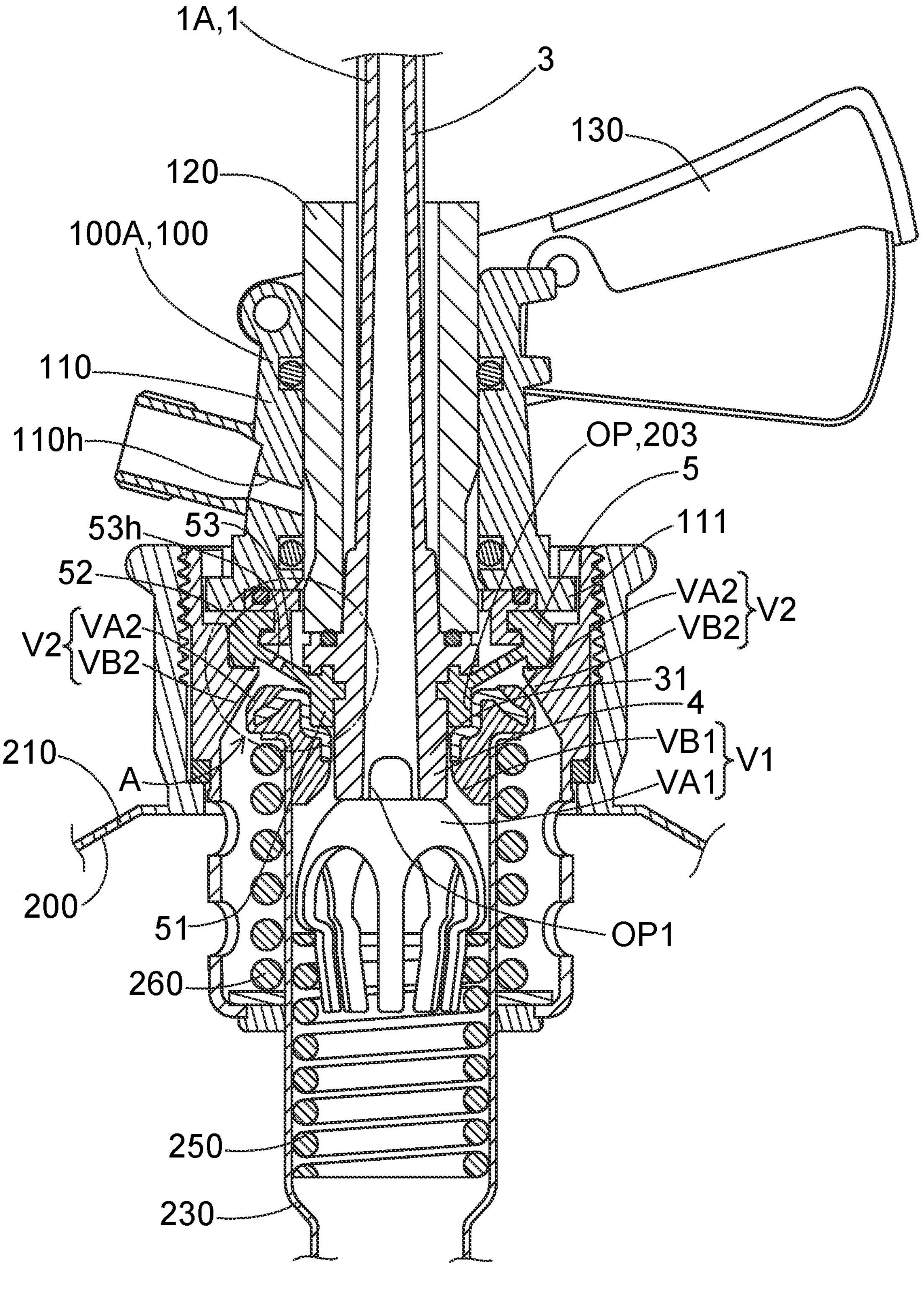
FIG. 4 is a schematic cross-sectional view schematically showing a state in which the dispense head is attached to the mouth portion of the beverage container.
Figure 5:
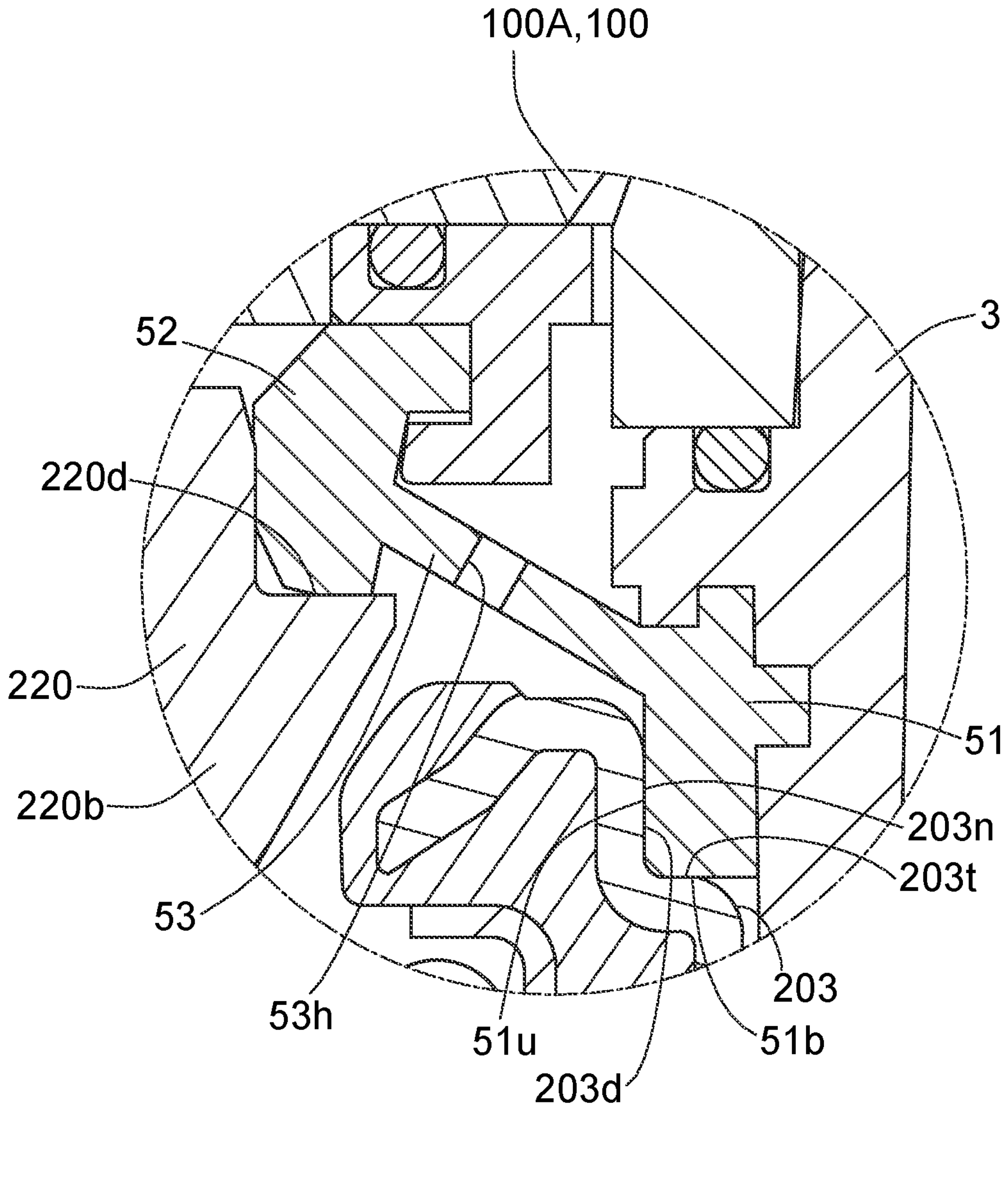
FIG. 5 is an enlarged cross-sectional view of a portion represented by a circle A in FIG. 4.
Figure 6:
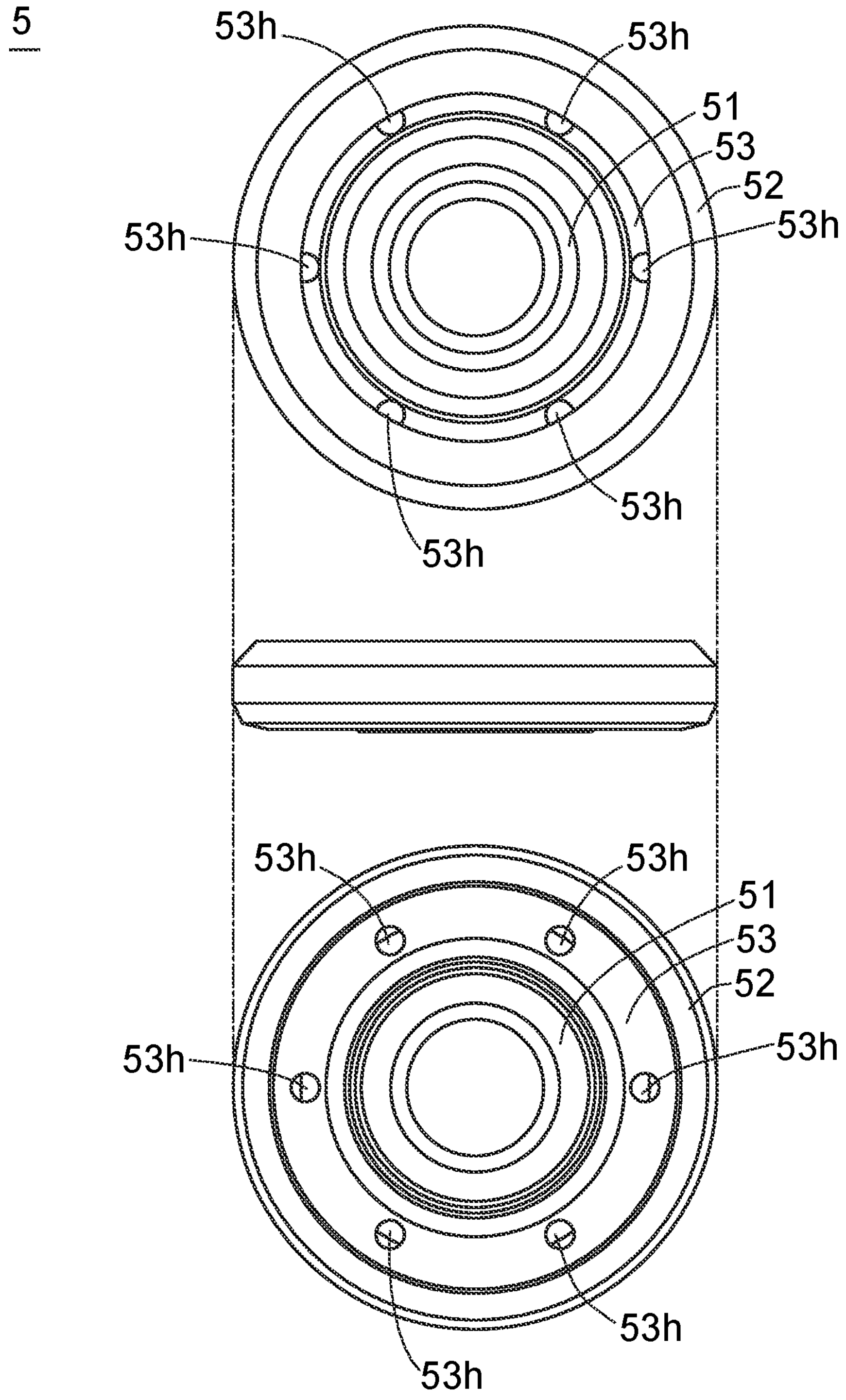
FIG. 6 is a schematic three-view schematically showing an example of a sealing member.
Figure 7:
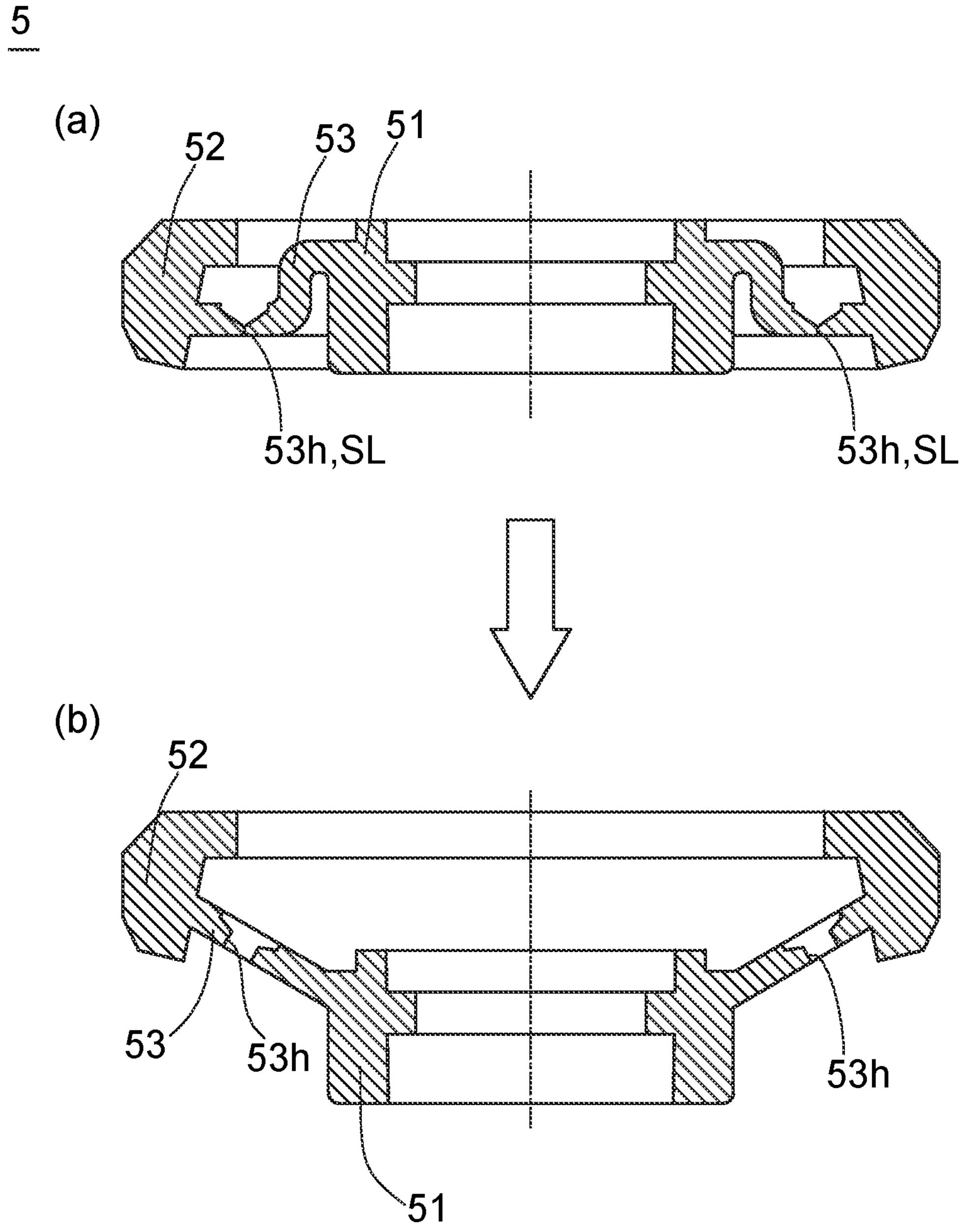
FIG. 7 is a schematic cross-sectional view schematically showing another example of the sealing member.
Figure 8:
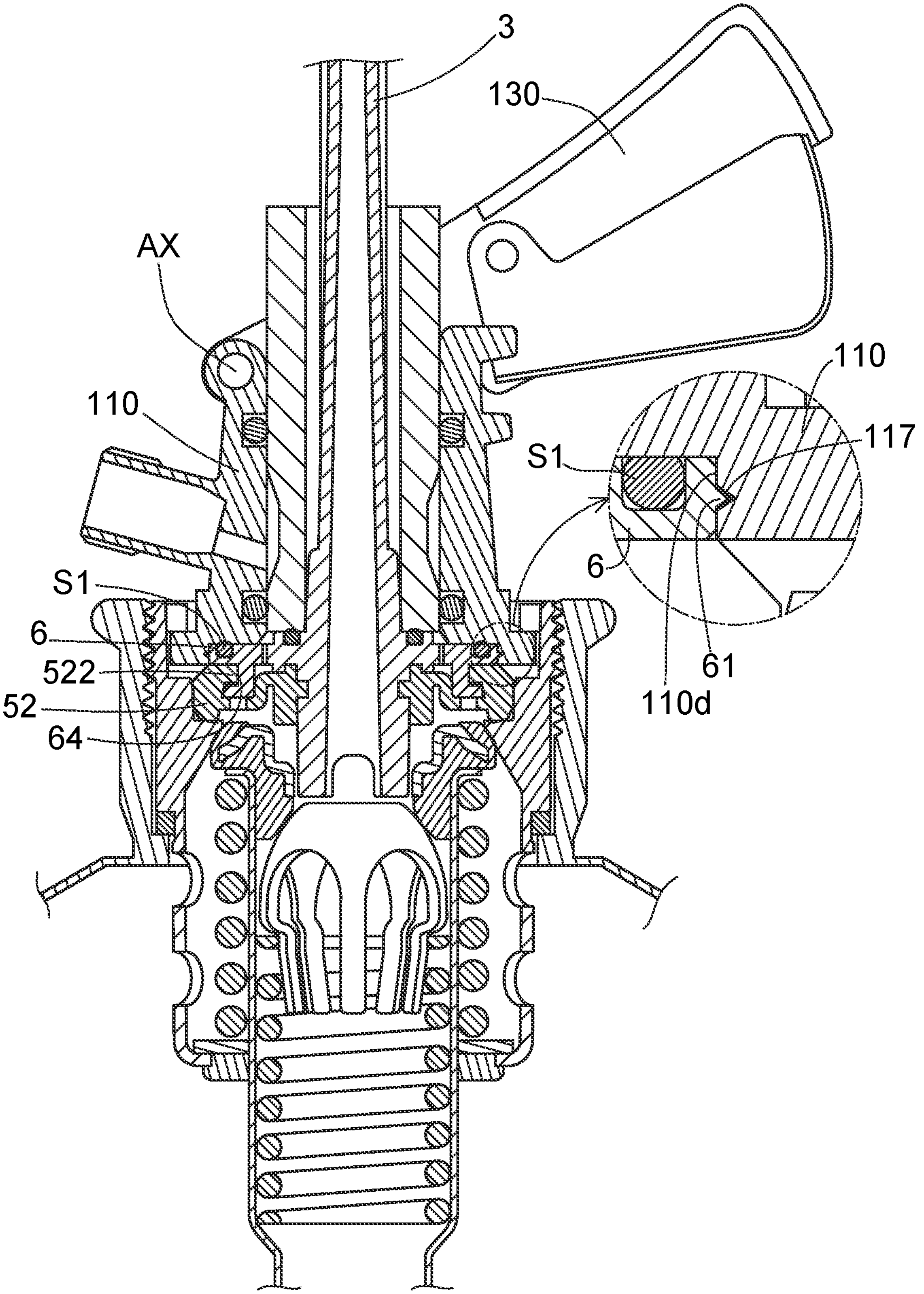
FIG. 8 is a schematic cross-sectional view schematically showing a state in which the dispense head is attached to the mouth portion of the beverage container.
Figure 9:
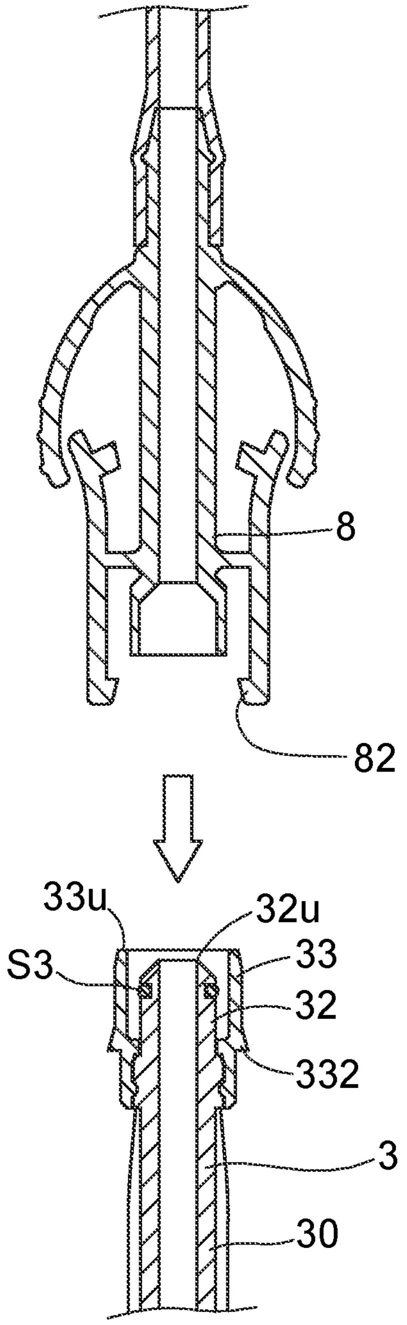
FIG. 9 is a schematic cross-sectional view schematically showing how a first pipe can be connected to a second pipe.
Figure 10:
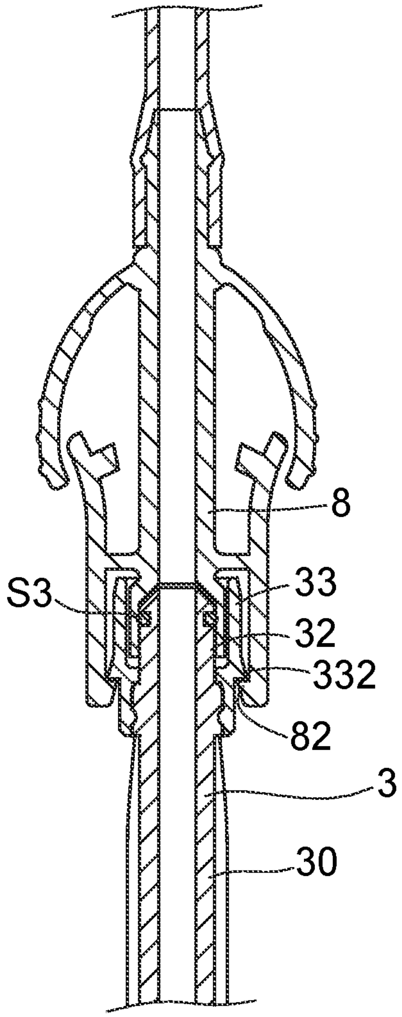
FIG. 10 is a schematic cross-sectional view schematically showing how the first pipe can be connected to the second pipe.
Figure 11:
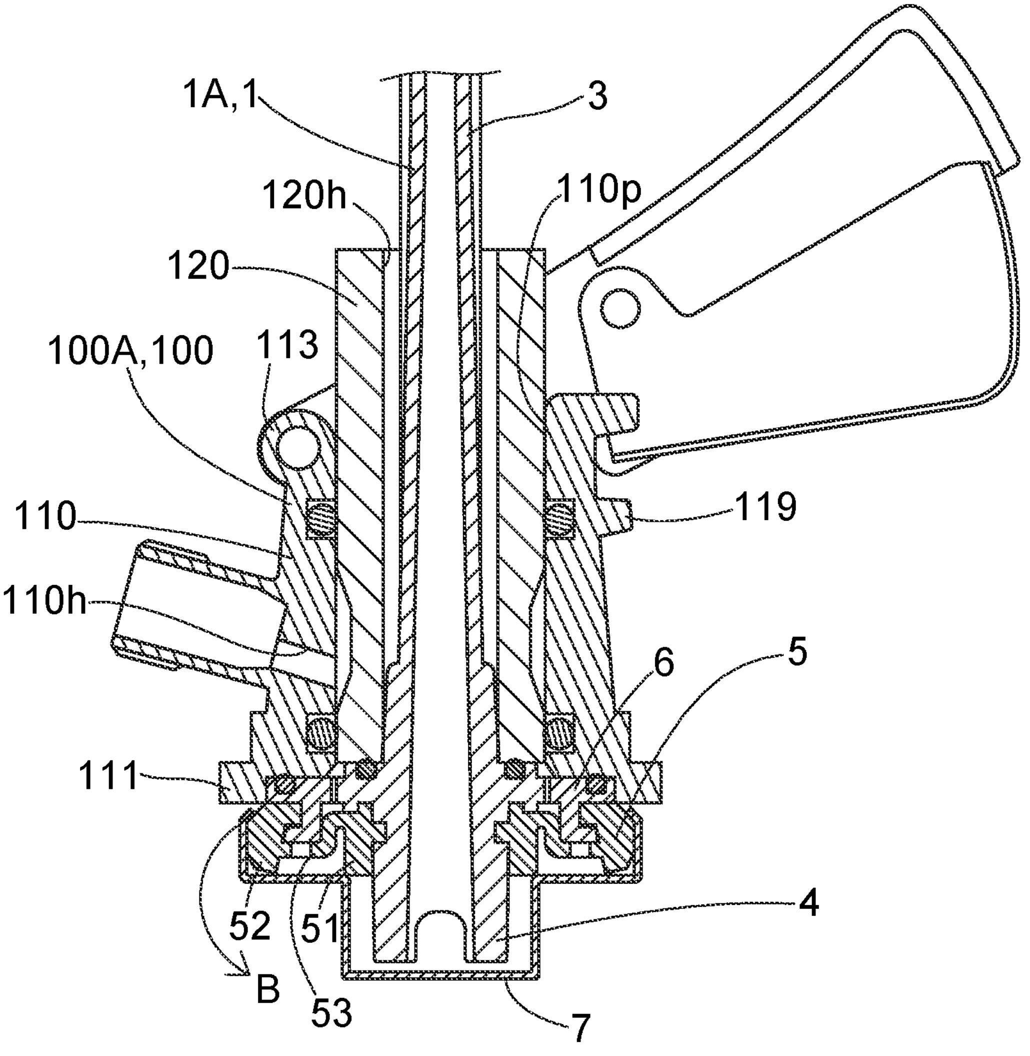
FIG. 11 is a schematic cross-sectional view schematically showing a state in which a protective cover covers the sealing member.

Referring to FIGS. 2 to 11, a replaceable component 1A for a dispense head according to a first embodiment will be described. FIG. 2 is a schematic cross-sectional view schematically showing a replaceable component 1A for a dispense head according to a first embodiment. FIGS. 3 and 4 are schematic cross-sectional views schematically showing a state in which a dispense head 100A is attached to a mouth portion 220 of a beverage container 200. FIG. 3 shows a state in which a beverage supply valve V1 is in a closed state, and FIG. 4 shows a state in which the beverage supply valve V1 is in an open state. FIG. 5 is an enlarged cross-sectional view of a portion represented by a circle A in FIG. 4. FIG. 6 is a schematic three-view schematically showing an example of a sealing member 5. A schematic plan view is shown on the upper side of FIG. 6, a schematic side view is shown in the center of FIG. 6, and a schematic bottom view is shown on the lower side of FIG. 6. FIG. 7 is a schematic cross-sectional view schematically showing another example of the sealing member 5. FIG. 8 is a schematic cross-sectional view schematically showing a state in which the dispense head 100A is attached to the mouth portion 220 of the beverage container 200. FIGS. 9 and 10 are schematic cross-sectional views schematically showing how a first pipe 3 can be connected to a second pipe 8. Note that FIG. 9 shows a state before the first pipe 3 and the second pipe 8 are connected, and FIG. 10 shows a state after the first pipe 3 and the second pipe 8 are connected. FIG. 11 is a schematic cross-sectional view schematically showing a state in which a protective cover 7 covers the sealing member 5.

(Replaceable Component 1A for a Dispense Head)

As shown in FIG. 2, a replaceable component 1A for a dispense head according to a first embodiment includes a first pipe 3, a pressing portion 4, and a sealing member 5.

As shown in FIG. 3, the first pipe 3 is a member arranged so as to pass through an inside of the dispense head 100A (more specifically, an inside of a plunger member 120 of the dispense head 100A). In a case in which the first pipe 3 is arranged inside the dispense head 100A (more specifically, inside the plunger member 120) and a beverage flows through the inside of the first pipe 3, the beverage does not adhere to an inner surface of the dispense head 100A (more specifically, an inner surface of the plunger member 120).

The first pipe 3 may be composed of one part or may be composed of an assembly of a plurality of parts. The first pipe 3 is made of, for example, a resin. The first pipe 3 is preferably a rigid pipe, but the first pipe 3 may be a flexible pipe. The first pipe 3 is formed by, for example, injection molding.

In an example shown in FIG. 3, the pressing portion 4 can press a valve body VA1 of a beverage supply valve V1 in a beverage container 200. When the pressing portion 4 presses the valve body VA1, the valve body VA1 is separated from a valve seat portion VB1 of the beverage supply valve V1 (see FIG. 4). In this way, the beverage in a container main body 210 of the beverage container 200 can be taken out to the first pipe 3 via the beverage supply valve V1.

In the example shown in FIG. 3, the pressing portion and the first pipe 3 are integrally formed. More specifically, the pressing portion 4 is constituted by a first end portion 31 of the first pipe 3. Alternatively, the pressing portion 4 and the first pipe 3 may be separate bodies. In this case, a part constituting the pressing portion 4 is attached to the first pipe 3. The pressing portion 4 is made of, for example, a resin. The pressing portion 4 is preferably made of a hard resin (in other words, the pressing portion 4 is preferably made of a resin that is not substantially deflectable).

The sealing member 5 includes a first sealing portion 51 and a membrane 53 connected to the first sealing portion 51. In the example shown in FIG. 3, the sealing member 5 is separately provided from the first pipe 3 and the pressing portion 4, and the sealing member 5 is attached to the first pipe 3.

As shown in FIG. 4, the first sealing portion 51 is contactable with a beverage outlet 203 of the beverage container 200. In an example shown in FIG. 4, the beverage outlet 203 is constituted by an opening portion OP of the second valve body VA2 that constitutes a part of the gas valve V2.

As shown in FIG. 4, in a contact state where the first sealing portion 51 is in contact with the beverage outlet 203, a gap between the first end portion 31 of the first pipe 3 and the beverage outlet 203 is sealed by the first sealing portion 51. In this way, it is possible to prevent the beverage from leaking from the beverage outlet 203. The first sealing portion 51 may be made of a flexible resin (in other words, a soft resin), or may be made of rubber.

The membrane 53 inhibits the beverage from adhering to the dispense head 100A. In the example shown in FIG. 4, the membrane 53 is arranged on an outer side of the first sealing portion 51. The membrane 53 may be made of a flexible resin (in other words, a soft resin), or may be made of rubber. The membrane 53 and the first sealing portion 51 are preferably formed by integral molding.

When the pressing portion 4 is pulled up from a state illustrated in FIG. 4 to a state illustrated in FIG. 3, the beverage on the pressing portion 4 may be scattered toward the dispense head 100A. With the replaceable component 1A according to the first embodiment, even when the beverage is scattered toward the dispense head 100A (particularly, toward a lower surface of the dispense head 100A), the membrane 53 inhibits the beverage from adhering to the dispense head 100A.

In the first embodiment, it is the replaceable component 1A for a dispense head that comes in contact with the beverage, and the beverage is substantially prevented from coming in contact with the dispense head 100A. Therefore, frequency of cleaning the dispense head 100A can be reduced. Further, even when the beverage adheres to the dispense head 100A, the replaceable component 1A for a dispense head (more specifically, the first pipe 3 and the sealing member 5) prevents the adhered beverage from being mixed into the beverage in the beverage container 200. Further, in the first embodiment, a beverage supply flow path in a clean state can be reformed by just removing the replaceable component 1A for a dispense head which has been attached to the dispense head 100A and just attaching a new replaceable component for a dispense head to the dispense head 100A.

Next, an optional configuration that can be adopted in the replaceable component 1A for a dispense head according to the first embodiment will be described.

(First Sealing Portion 51 of the Sealing Member 5)

In an example shown in FIG. 5, the first sealing portion 51 fits into a recess portion 203*d* of the beverage outlet 203. Due to this fitting, a bottom surface 51*b* of the first sealing portion 51 comes in contact with a bottom surface 203*t* of the recess portion 203*d* and an outer peripheral surface 51*u* of the first sealing portion 51 comes in contact with an inner peripheral surface 203*n* of the recess portion 203*d*.

(Second Sealing Portion 52 of the Sealing Member 5)

In the example shown in FIG. 5, the sealing member 5 includes a second sealing portion 52 contactable with a mouth portion 220 of the beverage container 200.

In the example shown in FIG. 5, a recess portion 220*d* for receiving the second sealing portion 52 is formed in the mouth portion 220 (more specifically, formed in an inner member 220*b*). In the example shown in FIG. 5, when the second sealing portion 52 is received by the recess portion 220*d* of the mouth portion 220, a bottom surface of the second sealing portion 52 comes in contact with a bottom surface of the recess portion 220*d* and an outer peripheral surface of the second sealing portion 52 comes in contact with an inner peripheral surface of the recess portion 220*d*.

In a contact state where the second sealing portion is in contact with the mouth portion 220 (more specifically, the inner member 220*b*), the mouth portion 220 is sealed by the second sealing portion 52. In this way, it is possible to prevent a fluid such as a gas from leaking from a gap between the dispense head 100A and the mouth portion 220.

(Membrane 53 of the Sealing Member 5)

In the example shown in FIGS. 3 and 4, when the pressing portion 4 moves toward the valve body VA1 of the beverage supply valve V1, the membrane 53 deforms from a first state (see FIG. 3) to a second state (see FIG. 4). Since the membrane 53 is deformable between the first state and the second state, the membrane 53 can follow a movement of the pressing portion 4. The first state is, for example, a state in which the membrane 53 is loosened, and the second state is, for example, a state in which the membrane 53 is stretched (in other words, a state in which tension is acting on the membrane 53). The membrane 53 is formed of, for example, a flexible resin or rubber. The membrane 53 is preferably integrally molded with the first sealing portion 51 and/or the second sealing portion 52.

In the example shown in FIG. 3, the membrane 53 is arranged between the first sealing portion 51 and the second sealing portion 52. In the example shown in FIG. 3, the membrane 53 arranged between the first sealing portion 51 and the second sealing portion 52 inhibits the beverage from adhering to the dispense head 100A (particularly, the lower surface of the dispense head 100A). Further, when the membrane 53 is arranged between the first sealing portion 51 and the second sealing portion 52, a state of the membrane 53 (in other words, a shape of the membrane 53) is defined by a relative position of the first sealing portion 51 with respect to the second sealing portion 52. More specifically, when the first sealing portion 51 moves away from the second sealing portion 52 (moves downward in the example shown in FIG. 3), the state of the membrane 53 is changed from the above-mentioned first state (for example, the loosened state) to the above-mentioned second state (for example, the stretched state).

In the example shown in FIG. 3, the thickness of the first sealing portion 51 is larger than the thickness of the membrane 53. Alternatively, the thickness of the first sealing portion 51 may be about the same as the thickness of the membrane 53. For example, the first sealing portion 51 may be constituted by an inner side portion of the membrane 53.

In the example shown in FIG. 3, the thickness of the second sealing portion 52 is larger than the thickness of the membrane 53. Alternatively, the thickness of the second sealing portion 52 may be about the same as the thickness of the membrane 53. For example, the second sealing portion 52 may be constituted by an outer side portion of the membrane 53.

(Gas Passage Hole 53*h* of the Sealing Member 5)

In the example shown in FIG. 4, a gas passage hole 53*h* is formed in the sealing member 5 (more specifically, formed in the membrane 53). The gas passage hole 53*h* is used to introduce a gas (for example, carbon dioxide gas) supplied from the outside of the dispense head 100A into the beverage container 200 (more specifically, into the container main body 210 of the beverage container 200). In the example shown in FIG. 4, the gas supplied into the dispense head 100A via a dispense head main body 110 of the dispense head 100A is introduced into the container main body 210 of the beverage container 200 via the gas passage hole 53*h* and the gas valve V2 in an open state.

In an example shown in FIG. 6, the sealing member 5 (more specifically, the membrane 53) has six gas passage holes 53*h*. Alternatively, the sealing member 5 (more specifically, the membrane 53) may have only one gas passage hole or two, three, four, five, or seven or more gas passage holes 53*h*.

(Shape of First Sealing Portion 51, Second Sealing Portion 52, and Membrane 53)

In the example shown in FIG. 6, the first sealing portion 51 has a ring shape in a plan view (or a bottom view). Further, the second sealing portion 52 has a ring shape in a plan view (or a bottom view). Further, the membrane 53 has a ring shape in a plan view (or a bottom view). In the example shown in FIG. 6, an outer peripheral edge of the first sealing portion 51 is connected to an inner peripheral edge of the membrane 53. Further, an outer peripheral edge of the membrane 53 is connected to an inner peripheral edge of the second sealing portion 52.

In the example shown in FIG. 2, the first sealing portion 51 has a second engaging portion 512 that engages with a first engaging portion 34 of the first pipe 3. In the example shown in FIG. 2, the second engaging portion 512 includes an inner peripheral surface side engaging portion 512*a* formed on an inner peripheral surface of the first sealing portion 51. Alternatively or additionally, the second engaging portion 512 may include an upper surface side engaging portion 512*b* formed on an upper surface of the first sealing portion 51. In the example shown in FIG. 2, the first engaging portion 34 is an engaging recess 34*a*, and the second engaging portion 512 is an engaging protrusion. Alternatively, the first engaging portion 34 may be an engaging protrusion and the second engaging portion 512 may be an engaging recess.

In the example shown in FIG. 2, the second sealing portion 52 has a fourth engaging portion 522 that engages with a third engaging portion 64 of a held portion 6 held by the dispense head main body 110. In the example shown in FIG. 2, the fourth engaging portion 522 includes an inner peripheral surface side engaging portion 522*a* formed on an inner peripheral surface of the second sealing portion 52. Alternatively or additionally, the fourth engaging portion 522 may include an upper surface side engaging portion formed on an upper surface of the second sealing portion 52, or may include an outer peripheral surface side engaging portion formed on an outer peripheral surface of the second sealing portion 52. In the example shown in FIG. 2, the third engaging portion 64 is an engaging recess, and the fourth engaging portion 522 is an engaging protrusion. Alternatively, the third engaging portion 64 may be an engaging protrusion and the fourth engaging portion 522 may be an engaging recess.

(Modified Example of the Sealing Member 5)

In the example shown in FIG. 6, the gas passage hole 53*h* is an always open hole that is always open. Alternatively, as shown in FIG. 7(*a*), the gas passage hole 53*h* may be configured to close in an initial state (in other words, in a state in which the pressing portion 4 is separated from the valve body VA1 of the beverage supply valve V1), or may be configured to close in a state in which the membrane 53 is loosened. In an example shown in FIG. 7, the gas passage hole 53*h* is constituted by a slit SL formed in the membrane 53.

In the sealing member 5 shown in FIG. 7, the gas passage hole 53*h* can change states from a closed state to an open state. More specifically, when the first sealing portion 51 moves toward the beverage supply valve V1 together with the pressing portion 4, the membrane 53 deforms from the first state (more specifically, the loosened state) to the second state (more specifically, the stretched state). By deforming the membrane 53 into the second state, in other words, by stretching the membrane 53, the gas passage hole 53*h* is opened (see FIG. 7(*b*)).

In the example shown in FIG. 7, the gas passage hole 53*h* is closed when the pressing portion 4 moves away from the valve body VA1 of the beverage supply valve V1 (more specifically, when the membrane 53 is returning to the first state from the second state). In this case, the beverage on the pressing portion 4 etc. is certainly prevented from moving to the dispense head 100A side through the gas passage hole 53*h*. More specifically, in the membrane 53 in the first state (see FIG. 7(*a*)), the gas passage hole 53*h* is closed. Therefore, the membrane 53 in the first state can prevent the beverage more certainly from adhering to the dispense head 100A (particularly, the lower surface of the dispense head 100A).

In the example shown in FIG. 7, the gas passage hole 53*h* is opened by moving the pressing portion 4 toward the valve body VA1. Alternatively or additionally, the gas passage hole 53*h* may be opened by supplying the gas to the dispense head 100A (more specifically, to a gas inlet hole 110*h* of the dispense head 100A). More specifically, in a state in which the gas is not supplied to the dispense head 100A (more specifically, to the gas inlet hole 110*h*), the gas passage hole 53*h* may be closed even when the pressing portion 4 moves toward the valve body VA1, and the gas passage hole 53*h* may be opened when the gas is supplied to the dispense head 100A. Such a configuration can be feasible, for example, by arranging a check valve on the sealing member 5 (for example, the membrane 53). The check valve is opened, for example, when the gas is supplied to the dispense head 100A and the pressure in a space above the sealing member 5 increases. Even in such a modified example, the membrane 53 can prevent the beverage from adhering to the dispense head 100A (particularly, the lower surface of the dispense head 100A).

(Held Portion 6)

In the example shown in FIG. 3, the replaceable component 1A for a dispense head includes the held portion 6 held by the dispense head main body 110. The held portion 6 is, for example, made of a resin. The held portion 6 is, for example, formed by injection molding. In the example shown in FIG. 3, the held portion 6 and the first pipe 3 are separate bodies. Alternatively, the held portion 6 may be integrally molded with the first pipe 3 (for example, with a flange 35 of the first pipe 3).

In the example shown in FIG. 3, the held portion 6 is held by, for example, a recess 110*d* formed on a lower surface of the dispense head main body 110. Alternatively or additionally, as shown in FIG. 8, the held portion 6 may be held by an engaging portion 117 formed on the dispense head main body 110 (more specifically, a lower end portion of the dispense head main body 110). In an example shown in FIG. 8, by the engagement between an engaging portion 61 arranged in the held portion 6 and the engaging portion 117 arranged in the dispense head main body 110, the held portion 6 is held by the dispense head main body 110.

In the example shown in FIG. 8, a sealing ring (more specifically, a first sealing ring S1) is arranged on an upper surface of the held portion 6. The sealing ring prevents a fluid such as a gas from leaking from between the upper surface of the held portion 6 and a lower surface of the dispense head main body 110. If there is no possibility of fluid leakage etc., the sealing ring may be omitted.

In the example shown in FIG. 8, the held portion 6 includes the engaging portion (the third engaging portion 64) that engages with the engaging portion (the fourth engaging portion 522) of the second sealing portion 52. Therefore, the second sealing portion 52 is supported by the dispense head main body 110 via the held portion 6.

(First Pipe 3)

An example of the first pipe 3 will be described in more detail with reference to FIGS. 2 and 3, etc. In the present specification, of two end portions of the first pipe 3, an end portion on the side where the pressing portion 4 is arranged is referred to as a first end portion 31, and an end portion on an opposite side opposed to the side where the pressing portion 4 is arranged is referred to as a second end portion 32. The beverage supplied from the beverage container 200 to the first pipe 3 flows from the first end portion 31 to the second end portion 32. In the present specification, a direction from the first end portion 31 to the second end portion 32 may be referred to as an upward direction, and a direction from the second end portion 32 to the first end portion 31 may be referred to as a downward direction.

The length of the first pipe 3 is preferably longer than the length of a plunger member 120 of the dispense head 100A. The length of the first pipe 3 is, for example, 5 cm or more, or 10 cm or more.

In the example shown in FIG. 2, an inner diameter of the first pipe 3 decreases from the first end portion 31 toward the second end portion 32. Alternatively, the inner diameter of the first pipe 3 may be constant. In the example shown in FIG. 2, in the first end portion 31 of the first pipe 3 (more specifically, in a side wall of the first end portion 31), an opening OP1 to introduce the beverage from the outside of the first pipe 3 to the inside of the first pipe 3 is formed.

It is preferable that the maximum outer diameter of a portion of the first pipe 3 arranged in the plunger member 120 is set to a size that fits with the plunger member 120. In other words, it is preferable that an outer surface of the first pipe 3 and an inner surface of the plunger member 120 can be fitted together. However, it is not an essential configuration that the outer surface of the first pipe 3 and the inner surface of the plunger member 120 can be fitted together.

(Flange 35)

In the example shown in FIG. 2, the first pipe 3 includes the flange 35 extending in a direction away from a longitudinal central axis C1 of the first pipe 3. In the example shown in FIG. 2, the flange 35 is integrally molded with the first pipe 3 and is arranged on the outer peripheral surface of the first pipe 3. Note that the flange 35 and a first pipe main body 30 (a first pipe main body 30 that defines a beverage flow path) may be formed separately, and the flange 35 may be attached to the first pipe main body 30. The flange 35 is made of, for example, a resin. The flange 35 is preferably made of a hard resin (in other words, the flange 35 is preferably made of a resin that is not substantially deflectable).

In the example shown in FIG. 2, a lower surface of the flange 35 is in contact with the upper surface of the first sealing portion 51. In this way, the flange 35 prevents the first sealing portion 51 from moving upward beyond the flange 35. More specifically, in the example shown in FIG. 4, when the first sealing portion 51 is in contact with the beverage outlet 203 of the beverage container 200, an upward force acts on the first sealing portion 51 due to the contact. On the other hand, the flange 35 presses the first sealing portion 51 downward. In this way, the first sealing portion 51 is sandwiched between the beverage outlet 203 and the flange 35, and the movement of the first sealing portion 51 is prevented.

In the example shown in FIG. 2, the first engaging portion 34 that engages with the second engaging portion 512 of the sealing member 5 is formed on the lower surface of the flange 35. In the example shown in FIG. 2, the first engaging portion 34 is the engaging recess 34*a*. Alternatively, the first engaging portion 34 may be an engaging protrusion.

In the example shown in FIG. 3, an upper surface of the flange 35 is in contact with a lower surface of the plunger member 120. In other words, the upper surface of the flange 35 functions as a pressed surface to be pressed by the plunger member 120. More specifically, when the plunger member 120 moves downward relative to the dispense head main body 110, the plunger member 120 presses the flange 35. In this way, the flange 35 moves downward together with the plunger member 120. When the flange 35 moves downward, the flange 35 presses the upper surface of the first sealing portion 51 downward. In this way, the first sealing portion 51 moves downward together with the flange 35 and the plunger member 120.

In the example shown in FIG. 3, a sealing ring (more specifically, a second sealing ring S2) is arranged on the upper surface of the flange 35. The sealing ring prevents a fluid such as a gas from leaking from between the upper surface of the flange 35 and the lower surface of the plunger member 120. If there is no possibility of fluid leakage etc., the sealing ring may be omitted.

(Reinforcing Rib 37)

In the example shown in FIG. 3, a reinforcing rib 37 extending in a direction parallel to the longitudinal central axis C1 of the first pipe 3 is arranged on the outer surface of the first pipe 3. The presence of the reinforcing rib 37 improves the rigidity of the first pipe 3.

(End Portion Connectable to Second Pipe 8)

As shown in FIG. 9, the first pipe 3 preferably includes an end portion connectable to a second pipe 8 and a cover portion 33 arranged to cover the end portion.

In an example shown in FIG. 9, the end portion connectable to the second pipe 8 is the second end portion 32 of the first pipe 3. In the example shown in FIG. 9, a sealing ring (more specifically, a third sealing ring S3) is arranged on an outer peripheral surface of the second end portion 32. The sealing ring prevents the beverage from leaking from between the first pipe 3 and the second pipe 8.

The cover portion 33 prevents an operator's hand from touching the end portion (in other words, the second end portion 32) connectable to the second pipe 8. In the example shown in FIG. 9, an upper end 33*u* of the cover portion 33 is located above an upper end 32*u* of the second end portion 32. In other words, in a side view, the upper end 32*u* of the second end portion 32 is hidden by the cover portion 33. In this case, the operator's hand is effectively prevented from touching the second end portion 32.

In the example shown in FIG. 9, the cover portion 33 and the first pipe main body 30 are separate bodies, and the cover portion 33 is attached to the first pipe main body 30. Alternatively, the cover portion 33 may be integrally molded with the first pipe main body 30.

In the example shown in FIG. 9, the cover portion 33 is a tubular body having a tubular shape. Further, in the example shown in FIG. 9, the cover portion 33 constitutes an outer cylinder arranged outside the second end portion 32, and the second end portion 32 constitutes an inner cylinder arranged inside the cover portion 33.

In an example shown in FIG. 10, the cover portion 33 is formed with an engaging portion 332 that can engage with an engaging portion 82 of the second pipe 8. Alternatively or additionally, the engaging portion 332 that can engage with the engaging portion 82 of the second pipe 8 may be formed at the second end portion 32 of the first pipe 3.

(Protective Cover 7)

In an example shown in FIG. 11, the replaceable component 1A for a dispense head includes a protective cover 7 capable of covering the sealing member 5 (more specifically, a lower surface of the sealing member 5). In the example shown in FIG. 11, the protective cover 7 collectively covers a lower surface of the first sealing portion 51, a lower surface of the membrane 53, and a lower surface of the second sealing portion 52.

The protective cover 7 is preferably attached to the sealing member 5 at an arbitrary timing after the sealing member 5 is manufactured. Further, the protective cover 7 is preferably removed from the sealing member 5 after the first pipe 3 is arranged to pass through the inside of the dispense head 100A (more specifically, the inside of the plunger member 120 of the dispense head 100A).

In the example shown in FIG. 11, until attaching the replaceable component 1A for a dispense head to the dispense head 100A is completed, it is possible to maintain a state in which the protective cover 7 covers the sealing member 5 (more specifically, the lower surface of the sealing member 5). Therefore, when the replaceable component 1A for a dispense head is attached to the dispense head 100A, it prevents the operator's hand from touching the sealing member 5 (more specifically, the lower surface of the sealing member 5).

In the example shown in FIG. 11, the protective cover 7 collectively covers the lower surface of the sealing member 5 and the pressing portion 4. Therefore, the protective cover 7 prevents the operator's hand from touching the lower surface of the sealing member 5, and also prevents the operator's hand from touching the pressing portion 4. In this way, germs and the like are prevented from adhering to the sealing member 5 or the pressing portion 4. The protective cover 7 may be a flexible cover or a rigid cover.

Second Embodiment

Figure 12:
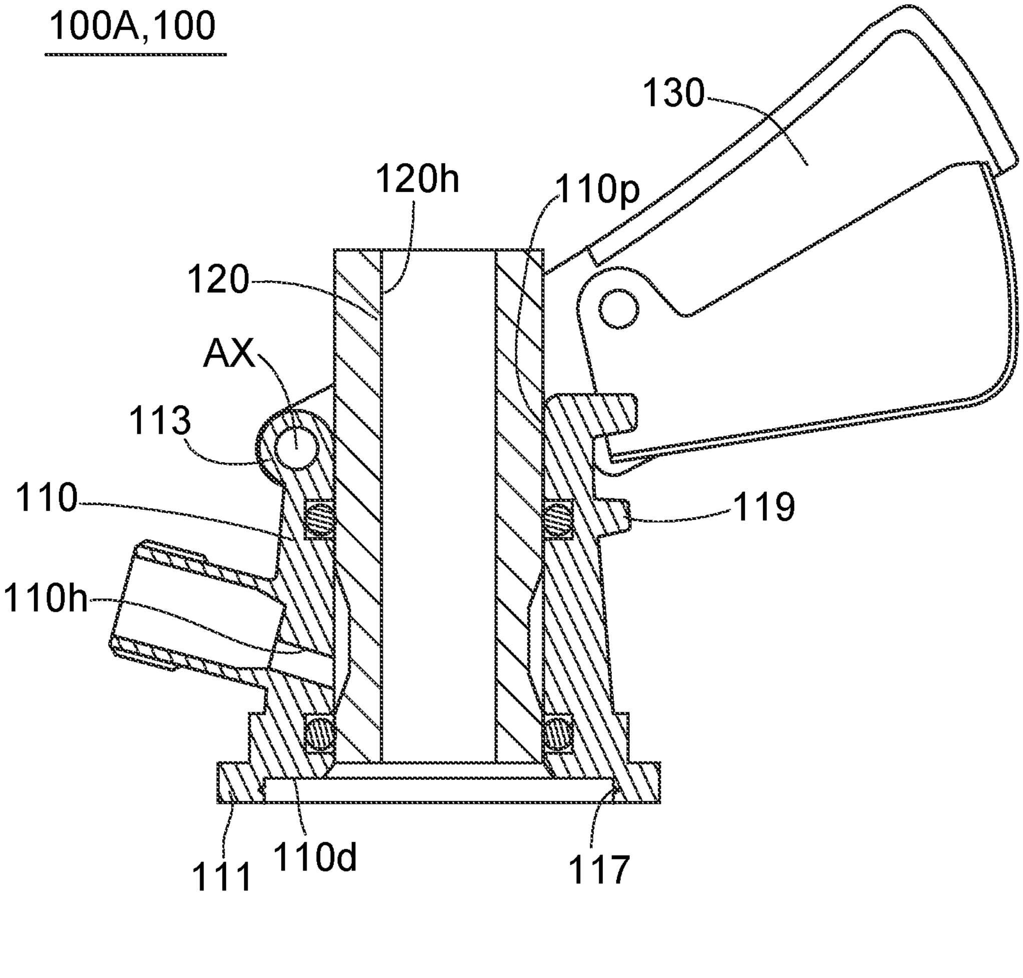
FIG. 12 is a schematic cross-sectional view schematically showing a dispense head according to a second embodiment.

Referring to FIG. 3, FIG. 4, FIG. 5, FIG. 8, FIG. 11, and FIG. 12, a dispense head 100A according to a second embodiment will be explained. FIG. 12 is a schematic cross-sectional view schematically showing a dispense head 100A according to a second embodiment.

In the second embodiment, points different from those in the first embodiment will be mainly described. On the other hand, in the second embodiment, a repetitive description of the matters explained in the first embodiment will be omitted. Therefore, it goes without saying that the matters explained in the first embodiment can be applied to the second embodiment even if explanation is not explicitly given in the second embodiment.

A dispense head 100A according to the second embodiment is a dispense head to which the replaceable component 1A for a dispense head according to the first embodiment can be attached.

In an example shown in FIG. 12, the dispense head 100A includes a dispense head main body 110, a plunger member 120, and an operating member 130.

In the example shown in FIG. 12, the dispense head main body 110 includes an attachment portion 111 for attaching the dispense head main body 110 to the beverage container 200, a gas inlet hole 110*h* for introducing a gas (for example, carbon dioxide) from the outside of the dispense head main body 110 into the inside of the dispense head main body 110, a hole portion 110*p* that receives the plunger member 120 in such a way that the plunger member 120 can slidably move relative to the hole portion 110*p*, and a connecting portion 113 for connecting the operating member 130 to the dispense head main body 110.

As shown in FIG. 12, on a lower surface of the dispense head main body 110, a recess 110*d* that can receive a part of the replaceable component 1A for a dispense head (for example, a part of the held portion 6 described above) may be formed. Further, the dispense head main body 110 may include a engaging portion 117 that can engage with a part of the replaceable component 1A for a dispense head (for example, the held portion 6 described above).

The dispense head main body 110 is made of, for example, metal (more specifically, made of stainless steel).

The plunger member 120 is formed with a through hole 120*h* into which the first pipe 3 constituting a part of the replaceable component 1A for a dispense head can be inserted. Further, by pressing the first pipe 3 (more specifically, the flange 35 of the first pipe 3) downward, the plunger member 120 can move the first sealing portion 51 and the pressing portion 4, which constitute parts of the replaceable component 1A for a dispense head, downward.

The plunger member 120 is made of, for example, metal (more specifically, made of stainless steel).

The operating member 130 is a member that operates the plunger member 120 such that the plunger member 120 moves relative to the dispense head main body 110. In the example shown in FIG. 12, the operating member 130 is an operation lever that can swing around a rotational axis AX arranged in the dispense head main body 110. When the operating member 130 is operated in a first operating direction (more specifically, downward), the plunger member 120 moves downward. On the other hand, when the operating member 130 is operated in a second operating direction (more specifically, upward), the plunger member 120 moves upward. As shown in FIG. 12, the dispense head main body 110 may be provided with an engaging portion 119 that engages with the operating member 130 (more specifically, the operation lever). When the operating member 130 is operated in such a way that the plunger member 120 moves downward, the engaging portion 119 engages with the operating member 130. This engagement prevents the operating member 130 from being unintentionally operated in the second operating direction (more specifically, upward), and prevents the plunger member 120 from being unintentionally moved upward.

Third Embodiment

Figure 13:
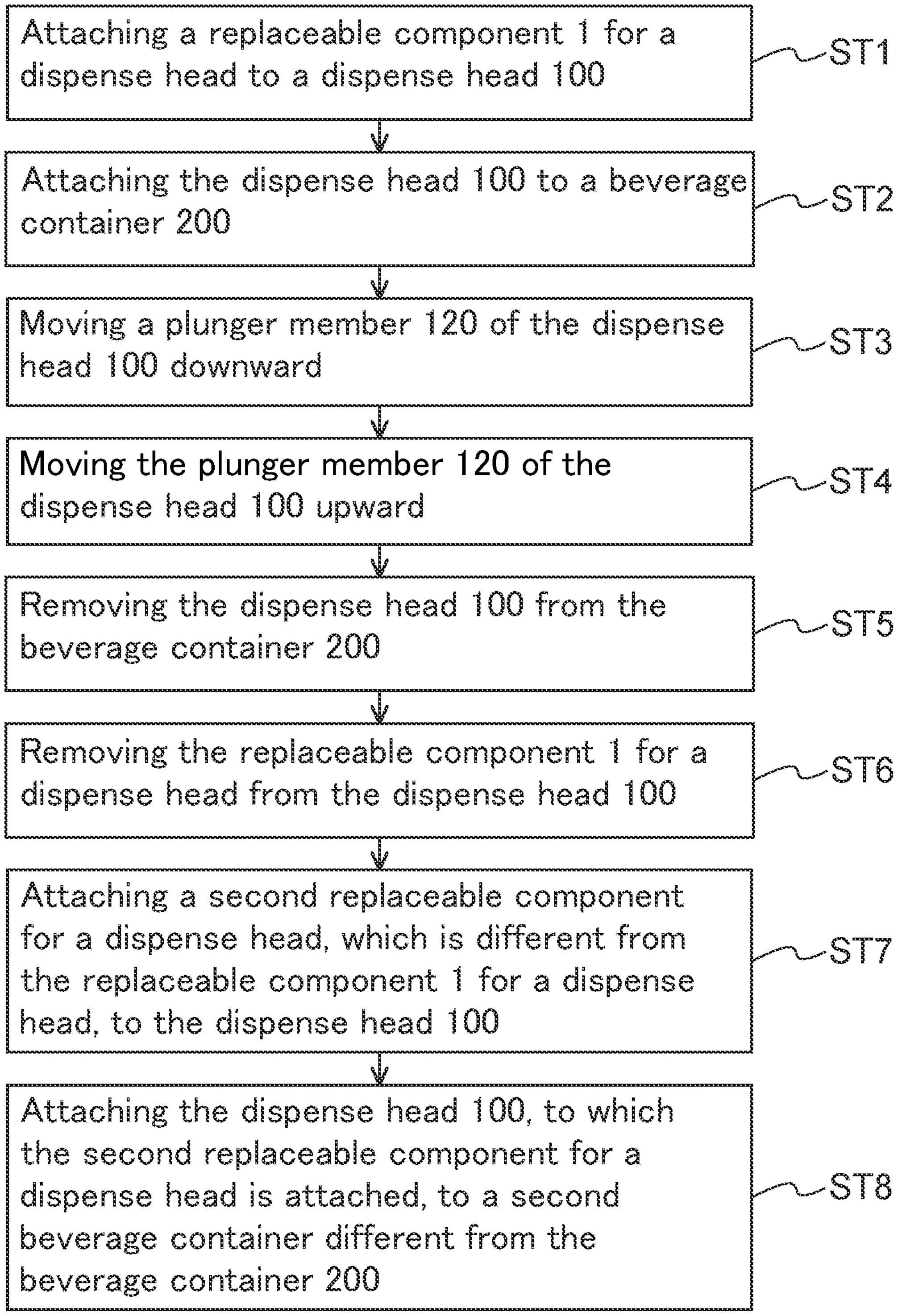
FIG. 13 is a flowchart indicating an example of a method of using a dispense head according to a third embodiment.

Referring to FIGS. 1 to 13, a method of using a dispense head according to a third embodiment will be explained. FIG. 13 is a flowchart indicating an example of a method of using a dispense head 100 according to a third embodiment.

A replaceable component 1 for a dispense head used in a method of using a dispense head according to a third embodiment may be the replaceable component 1A for a dispense head according to the first embodiment, or may be another replaceable component for a dispense head. Further, a dispense head 100 used in the method of using a dispense head according to the third embodiment may be the dispense head 100A according to the second embodiment, or may be another dispense head.

In a first step ST1, the replaceable component 1 for a dispense head is attached to the dispense head 100. The first step ST1 is a first attaching step.

The first step ST1 (the first attaching step) is executed, for example, by inserting a first pipe 3 of the replaceable component 1 for a dispense head into a plunger member 120 of the dispense head 100. The first step ST1 (the first attaching step) is preferably executed by inserting the first pipe 3 into the plunger member 120 in a direction from a lower end of the plunger member 120 toward an upper end of the plunger member 120.

The first step ST1 (the first attaching step) may include a holding step of holding a part of the replaceable component 1 for a dispense head (for example, a held portion 6) by a dispense head main body 110. The holding step may include fitting (for example, see FIG. 8) a lower end portion of the dispense head main body 110 (for example, a recess 110*d* formed on a lower surface of the dispense head main body 110) and a part of the replaceable component 1 for a dispense head (for example, the held portion 6). Alternatively or additionally, the holding step may include engaging (for example, see FIG. 8) an engaging portion 117 formed at a lower end portion of the dispense head main body 110 and a part of the replaceable component 1 for a dispense head (for example, the held portion 6).

After execution of the first step ST1 (the first attaching step) and before execution of a third step ST3 described later, a second end portion 32 of the first pipe 3 may be connected to a second pipe 8 (for example, see FIG. 10). The second pipe 8 may be a part of a replaceable component for a beverage pouring portion, or may be another part.

Further, after the execution of the first step ST1 (the first attaching step) and before execution of a second step ST2 described later, a protective cover 7 may be removed from a sealing member 5 (for example, see the arrow B in FIG. 11).

In the second step ST2, the dispense head 100 is attached to a beverage container 200. The second step ST2 is a second attaching step.

The second step ST2 (the second attaching step) is executed, for example, by moving the dispense head 100, to which the replaceable component 1 for a dispense head is attached, downward toward the beverage container 200 and then rotating the dispense head 100 relative to a mouth portion 220 of the beverage container 200.

By executing the second step ST2 (the second attaching step), an attachment portion 111 of the dispense head 100 is attached to the mouth portion 220 (more specifically, an inner member 220*b*) of the beverage container 200.

In the example shown in FIG. 3, by executing the second step ST2 (the second attaching step), a second sealing portion 52 of the sealing member 5 comes in contact with the mouth portion 220 (more specifically, the inner member 220*b*). In this way, the mouth portion 220 (more specifically, the inner member 220*b*) is sealed by the second sealing portion 52.

In the third step ST3, the plunger member 120 of the dispense head 100 is moved downward. The third step ST3 is a first moving step.

The third step ST3 (the first moving step) is executed, for example, by operating an operating member 130 in a first operating direction (for example, downward).

By executing the third step ST3 (the first moving step), the plunger member 120 (more specifically, a lower end portion of the plunger member 120) presses the first pipe 3 (more specifically, a flange 35).

In the example shown in FIG. 4, a first sealing portion 51 of the sealing member 5 is arranged on an outer peripheral surface of the first pipe 3. Therefore, by executing the third step ST3 (the first moving step), the first sealing portion 51 moves downward. The first sealing portion 51 moving downward comes in contact with a beverage outlet 203. In this way, the beverage outlet 203 is sealed by the first sealing portion 51. After the first sealing portion 51 comes in contact with the beverage outlet 203, by moving the plunger member 120 and the first pipe 3 downward further, the first sealing portion 51 presses a second valve body VA2 (that is, a valve body of a gas valve V2), which constitutes the beverage outlet 203, downward. In this way, the gas valve V2 is opened. When the gas valve V2 is opened, a gas introduced into the dispense head main body 110 through a gas inlet hole 110*h* is supplied into a container main body 210 of the beverage container 200. It is preferable that the gas is supplied from the inside of the dispense head main body 110 to the inside of the container main body 210 through a gas passage hole 53*h* of the sealing member 5.

In the example shown in FIG. 4, a pressing portion 4 is arranged at a lower end portion of the first pipe 3. Therefore, by executing the third step ST3 (the first moving step), the pressing portion 4 moves downward. The pressing portion 4 moving downward presses a valve body VA1 of a beverage supply valve V1. In this way, the beverage supply valve V1 is opened. When the beverage supply valve V1 is opened, the beverage in the container main body 210 is taken out to the first pipe 3 via a beverage extraction pipe 230 in the beverage container 200, the beverage supply valve V1, and an opening OP1 of the first pipe 3.

In the example shown in FIG. 4, by executing the third step ST3 (the first moving step), a membrane 53 of the sealing member 5 deforms from a first state (see FIG. 3) to a second state (see FIG. 4). In this way, with a part of the sealing member 5 held by the dispense head main body 110 (more specifically, with a part of the sealing member 5 held between the dispense head main body 110 and the mouth portion 220), another part of the sealing member 5 (more specifically, the first sealing portion 51) can be moved downward.

In a fourth step ST4, the plunger member 120 of the dispense head 100 is moved upward. The fourth step ST4 is a second moving step.

The fourth step ST4 (the second moving step) is executed, for example, by operating the operating member 130 in a second operating direction (for example, upward).

By executing the fourth step ST4 (the second moving step), the first pipe 3 and the first sealing portion 51 moves upward. In a case in which the plunger member 120 and the first pipe 3 are fitted together, the first pipe 3 and the first sealing portion 51 moves upward as the plunger member 120 of the dispense head 100 moves upward.

In a case in which the plunger member 120 and the first pipe 3 are not fitted, the first pipe 3 and the first sealing portion 51 moves upward when the valve body VA1 of the beverage supply valve V1 moves upward by a biasing force of a first biasing member 250 (see FIG. 4), or when the second valve body VA2 of the gas valve V2 moves upward by a biasing force of a second biasing member 260 (see FIG. 4).

More specifically, when the valve body VA1 moves upward due to the biasing force of the first biasing member 250, the valve body VA1 presses the pressing portion 4 arranged at the lower end portion of the first pipe 3, upward. In this way, the first pipe 3 and the pressing portion 4 moves upward. As the valve body VA1 moves upward, the valve body VA1 comes in contact with a valve seat portion VB1. In this way, the beverage supply valve V1 is closed.

Further, when the second valve body VA2 moves upward due to the biasing force of the second biasing member 260, the second valve body VA2 presses the first sealing portion 51 upward. In this way, the first sealing portion 51 moves upward together with the first pipe 3 and the pressing portion 4. As the second valve body VA2 moves upward, the second valve body VA2 comes in contact with a second valve seat portion VB2. In this way, the gas valve V2 is closed.

By executing the fourth step ST4 (the second moving step), the membrane 53 of the sealing member 5 returns from the second state (see FIG. 4) to the first state (see FIG. 3). In this way, with the part of the sealing member 5 held by the dispense head main body 110 (more specifically, with the part of the sealing member 5 held between the dispense head main body 110 and the mouth portion 220), it is possible to move another part of the sealing member 5 (more specifically, the first sealing portion 51) upward.

In a fifth step ST5, the dispense head 100 is removed from the beverage container 200. The fifth step ST5 is a first removal step.

The fifth step ST5 (the first removal step) is executed, for example, by rotating the dispense head 100, to which the replaceable component 1 for a dispense head is attached, relative to the mouth portion 220 of the beverage container 200 and then moving the dispense head 100 upward relative to the beverage container 200.

By executing the fifth step ST5 (the first removal step), the attachment portion 111 of the dispense head 100 is detached from the mouth portion 220 (more specifically, the inner member 220*b*) of the beverage container 200.

After the execution of the fifth step ST5 (the first removal step) and before execution of a sixth step ST6 described later, the second end portion 32 of the first pipe 3 may be detached from the second pipe 8.

In the sixth step ST6, the replaceable component 1 for a dispense head is removed from the dispense head 100. The sixth step ST6 is a second removal step.

The sixth step ST6 (the second removal step) is executed, for example, by taking out the first pipe 3 of the replaceable component 1 for a dispense head from the plunger member 120 of the dispense head 100. The sixth step ST6 (the second removal step) is preferably executed by pulling out the first pipe 3 from the plunger member 120 in a direction from the upper end of the plunger member 120 toward the lower end of the plunger member 120.

In a seventh step ST7, a second replaceable component for a dispense head, which is different from the replaceable component 1 for a dispense head, is attached to the dispense head 100. The second replaceable component for a dispense head is preferably a component of the same type as the above-mentioned replaceable component 1 for a dispense head (more specifically, the second replaceable component preferably has the same shape as the replaceable component 1 for a dispense head). The seventh step ST7 is the same as the first step ST1 described above, except that the "replaceable component 1 for a dispense head" is replaced with the "second replaceable component for a dispense head". Therefore, a repetitive description of the seventh step ST7 will be omitted.

In an eighth step ST8, the dispense head 100, to which the second replaceable component for a dispense head is attached, is attached to a second beverage container different from the beverage container 200 described above. The eighth step ST8 is the same as the second step ST2 described above, except that the "replaceable component 1 for a dispense head" and the "beverage container 200" are replaced with the "second replaceable component for a dispense head" and the "second beverage container", respectively. Therefore, a repetitive description of the eighth step ST8 will be omitted.

In the method of using the dispense head 100 according to the third embodiment, the membrane 53 inhibits the beverage from adhering to the dispense head 100.

In the third embodiment, it is preferable that a lower surface of the dispense head 100 is covered with the membrane 53 during the execution of the third step ST3 (the first moving step) and the fourth step (the second moving step). In this case, it is possible to inhibit the beverage from adhering to the lower surface of the dispense head 100 during the execution of the third step ST3 (the first moving step) and the fourth step (the second moving step).

In the third embodiment, it is preferable that the lower surface of the dispense head 100 is covered with the membrane 53 during the execution of the fifth step ST5 (the first removal step). In this case, it is possible to inhibit the beverage from adhering to the lower surface of the dispense head 100 during the execution of the fifth step ST5 (the first removal step).

Further, when the method of using the dispense head 100 according to the third embodiment includes the above-mentioned first step ST1 to eighth step ST8, a clean beverage supply flow path can be reformed simply by removing the replaceable component 1 for a dispense head, which has been attached to the dispense head 100, and attaching the second replaceable component for a dispense head to the dispense head 100.

The present invention is not limited to each of the above embodiments, and it is obvious that each embodiment or modified examples can be appropriately modified or may be changed within the scope of the technical idea of the present invention. In addition, the various techniques used in each embodiment or modified examples can be applied to other embodiments or modified examples as long as there is no technical contradiction. Further, any optional configuration in each embodiment or modified examples can be omitted as appropriate.

DESCRIPTION OF THE REFERENCE NUMERALS

1,1A replaceable component for a dispense head, 3 first pipe, 4 pressing portion, 5 sealing member, 6 held portion, 7 protective cover, 8 second pipe, 30 first pipe main body, 31 first end portion, 32 second end portion, 32*u* upper end, 33 cover portion, 33*u* upper end, 34 first engaging portion, 34*a* engaging recess, 35 flange, 37 reinforcing rib, 51 first sealing portion, 51*b* bottom surface, 51*u* outer peripheral surface, 52 second sealing portion, 53 membrane, 53*h* gas passage hole, 61 engaging portion, 64 third engaging portion, 82 engaging portion, 100,100A dispense head, 110 dispense head main body, 110*d* recess, 110*h* gas inlet hole, 110*p* hole portion, 111 attachment portion, 113 connecting portion, 117 engaging portion, 119 engaging portion, 120 plunger member, 120*h* through hole, 130 operating member, 200 beverage container, 203 beverage outlet, 203*d* recess portion, 203*n* inner peripheral surface, 203*t* bottom surface, 210 container main body, 220 mouth portion, 220*a* mouth member, 220*b* inner member, 220*d* recess portion, 230 beverage extraction pipe, 250 first biasing member, 260 second biasing member, 332 engaging portion, 512 second engaging portion, 512*a* inner peripheral surface side engaging portion, 512*b* upper surface side engaging portion, 522 fourth engaging portion, 522*a* inner peripheral surface side engaging portion, F fitting member, OP opening portion, OP1 opening, S sealing member, S1 first sealing ring, S2 second sealing ring, S3 third sealing ring, SL slit, V1 beverage supply valve, V2 gas valve, VA1 valve body, VA2 second valve body, VB1 valve seat portion, VB2 second valve seat portion

The invention claimed is:

1. A replaceable component for a dispense head having a dispense head main body and a plunger member comprising:

a first pipe disposed to pass through an inside of the plunger member movable relative to the dispense head main body;

a pressing portion capable of pressing a valve body of a beverage supply valve in a beverage container; and a sealing member, wherein the sealing member includes:

a first sealing portion capable of coming in contact with a beverage outlet of the beverage container; and a membrane connected to the first sealing portion and inhibiting a beverage from adhering to the dispense head.

2. The replaceable component for a dispense head having a dispense head main body and a plunger member according to claim 1, wherein when the pressing portion moves toward the valve body, the membrane deforms from a first state to a second state.

3. The replaceable component for a dispense head having a dispense head main body and a plunger member according to claim 1, wherein the sealing member includes a second sealing portion capable of coming in contact with a mouth portion of the beverage container, and wherein the membrane is disposed between the first sealing portion and the second sealing portion.

4. The replaceable component for a dispense head having a dispense head main body and a plunger member according to claim 1, wherein a gas passage hole is formed in the sealing member to introduce a gas supplied from outside of the dispense head to the beverage container.

5. The replaceable component for a dispense head having a dispense head main body and a plunger member according to claim 4, wherein the gas passage hole is opened when the pressing portion moves toward the valve body, and wherein the gas passage hole is closed when the pressing portion moves away from the valve body.

6. The replaceable component for a dispense head having a dispense head main body and a plunger member according to claim 4, wherein in a state in which the gas is not supplied to the dispense head, the gas passage hole is kept in a closed state even when the pressing portion moves toward the valve body, and wherein the gas passage hole is opened when the gas is supplied to the dispense head.

7. The replaceable component for a dispense head having a dispense head main body and a plunger member according to claim 1, further comprising:

a flange contacting an upper surface of the first sealing portion.

8. The replaceable component for a dispense head having a dispense head main body and a plunger member according to claim 1, wherein the first pipe includes:

an end portion connectable to a second pipe; and a cover portion disposed to cover the end portion, and preventing an operator's hand from touching the end portion.

9. The replaceable component for a dispense head having a dispense head main body and a plunger member according to claim 1, further comprising:

a protective cover capable of covering the sealing member, wherein the protective cover is detachable from the sealing member after the first pipe is placed to pass through the inside of the dispense head.

10. The replaceable component for a dispense head having a dispense head main body and a plunger member according to claim 1, wherein when the pressing portion moves toward the valve body, the membrane deforms from a loosened state to a stretched state.

11. The replaceable component for a dispense head having a dispense head main body and a plunger member according to claim 1, further comprising:

a held portion to be held by a recess formed on a lower surface of the dispense head main body.

12. The replaceable component for a dispense head having a dispense head main body and a plunger member according to claim 11, wherein the sealing member includes a second sealing portion capable of coming in contact with a mouth portion of the beverage container, wherein the membrane is disposed between the first sealing portion and the second sealing portion, and wherein the second sealing portion engages with the held portion.

13. The replaceable component for a dispense head having a dispense head main body and a plunger member according to claim 1, further comprising:

a flange contacting an upper surface of the first sealing portion, wherein the flange includes an upper surface to be pressed by the plunger member.

14. The replaceable component for a dispense head having a dispense head main body and a plunger member according to claim 1, wherein a reinforcing rib extending in a direction parallel to a longitudinal central axis of the first pipe is arranged on an outer surface of the first pipe.

15. The replaceable component for a dispense head having a dispense head main body and a plunger member according to claim 1, wherein the first pipe is insertable into the plunger member in a direction from a lower end of the plunger member toward an upper end of the plunger member.

16. A dispense head to which a replaceable component for a dispense head is attached, the replaceable component comprising:

a first pipe disposed to pass through an inside of the dispense head;

a pressing portion capable of pressing a valve body of a beverage supply valve in a beverage container; and a sealing member including a first sealing portion capable of coming in contact with a beverage outlet of the beverage container, and a membrane connected to the first sealing portion to inhibit a beverage from adhering to the dispense head, the dispense head comprising:

a dispense head main body;

a plunger member into which the first pipe is inserted and moving the first sealing portion and the pressing portion downward by pressing the first pipe downward; and an operating member operating the plunger member such that the plunger member moves relative to the dispense head main body.

17. A method of using a dispense head having a dispense head main body and a plunger member, the method comprising:

attaching a replaceable component for a dispense head to the dispense head;

attaching the dispense head to a beverage container;

moving the plunger member relative to the dispense head main body downward;

and moving the plunger member relative to the dispense head main body upward, wherein the replaceable component for a dispense head comprises:

a first pipe;

a pressing portion capable of pressing a valve body of a beverage supply valve in the beverage container; and a sealing member including a first sealing portion and a membrane inhibiting a beverage from adhering to the dispense head, wherein the moving the plunger member relative to the dispense head main body downward includes deforming the membrane from a first state to a second state, wherein the moving the plunger member relative to the dispense head main body upward includes restoring the membrane from the second state to the first state, and wherein the attaching a replaceable component for a dispense head to the dispense head includes inserting the first pipe of the replaceable component for a dispense head into the plunger member.

* * * * *